(12) United States Patent
Furukawa et al.

(10) Patent No.: US 6,856,608 B1
(45) Date of Patent: Feb. 15, 2005

(54) METHOD AND BASE STATION FOR ALLOCATING PSEUDO NOISE CODE

(75) Inventors: Hiroshi Furukawa, Tokyo (JP); Kojiro Hamabe, Tokyo (JP); Akihisa Ushirokawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/518,034

(22) Filed: Mar. 3, 2000

(30) Foreign Application Priority Data

Aug. 13, 1999 (JP) .......................................... 11-229466

(51) Int. Cl.$^7$ ................................................ H04Q 7/00
(52) U.S. Cl. ................................................... 370/328
(58) Field of Search ................................ 370/328–331, 370/341, 342; 331/203; 471/320, 342, 335, 395, 473, 341, 441; 375/219, 148, 267, 149, 146, 295; 455/212, 63.1, 70, 65; 517/701, 424, 524, 561, 453, 433–439, 404.1; 348/405; 206/321, 320; 209/330, 509, 392, 441

(56) References Cited

U.S. PATENT DOCUMENTS

| | | | | |
|---|---|---|---|---|
| 5,335,356 A | * | 8/1994 | Anderson | 455/517 |
| 5,568,482 A | * | 10/1996 | Li et al. | 370/471 |
| 5,592,225 A | * | 1/1997 | Kurobe | 348/405 |
| 5,859,875 A | * | 1/1999 | Kato et al. | 375/267 |
| 6,041,034 A | * | 3/2000 | Fukumasa et al. | 370/203 |
| 6,389,000 B1 | * | 5/2002 | Jou | 370/342 |
| 6,452,912 B1 | * | 9/2002 | Leem | 370/335 |

FOREIGN PATENT DOCUMENTS

| | | |
|---|---|---|
| JP | 9-64845 | 3/1997 |
| JP | 09-102979 | 4/1997 |
| JP | 10-145282 | 5/1998 |
| JP | 10-164009 | 6/1998 |
| JP | 11-74820 | 3/1999 |
| JP | 200-031939 | 1/2000 |
| JP | 2001-008262 | 1/2001 |
| WO | WO 99/12284 | 3/1999 |
| WO | WO 01/05079 | 1/2001 |

OTHER PUBLICATIONS

Japanese Office Action issued May 27, 2003 (w/ English translation of relevant portions).
Self Evaluation Report on Japan's Proposal for Candidate Radio Transmission Technology on IMT–2000: W–CDMA; Part II Revised RTT Proposal, Version 1.1, Sep. 1998.

* cited by examiner

*Primary Examiner*—Chi Pham
*Assistant Examiner*—Prenell Jones
(74) *Attorney, Agent, or Firm*—Dickstein, Shapiro, Morin & Oshinsky, L.L.P.

(57) ABSTRACT

To prevent degradation of transmission quality due to interference between scramble codes, under such a situation as soft hand over, when the number of mobile stations connected with a base station exceeds the number of the orthogonal codes. The base station decides the priority of the scramble code. The scramble code is allocated to the mobile station, in accordance with the priority. When a mobile station ends its call, or stops temporarily its call, its PN code is re-allocated to the mobile station with lowest priority code.

41 Claims, 15 Drawing Sheets

501 TOTAL NUMBER OF CODES USED BY CONNECTED MOBILE STATIONS = N

502 M = int (N/S) + 1

503 GENERATE M SETS OF FIRST CODE BY USING M SECOND CODES

504 USE (M-1) SETS OF FIRST CODE FOR RE-ALLOCATION

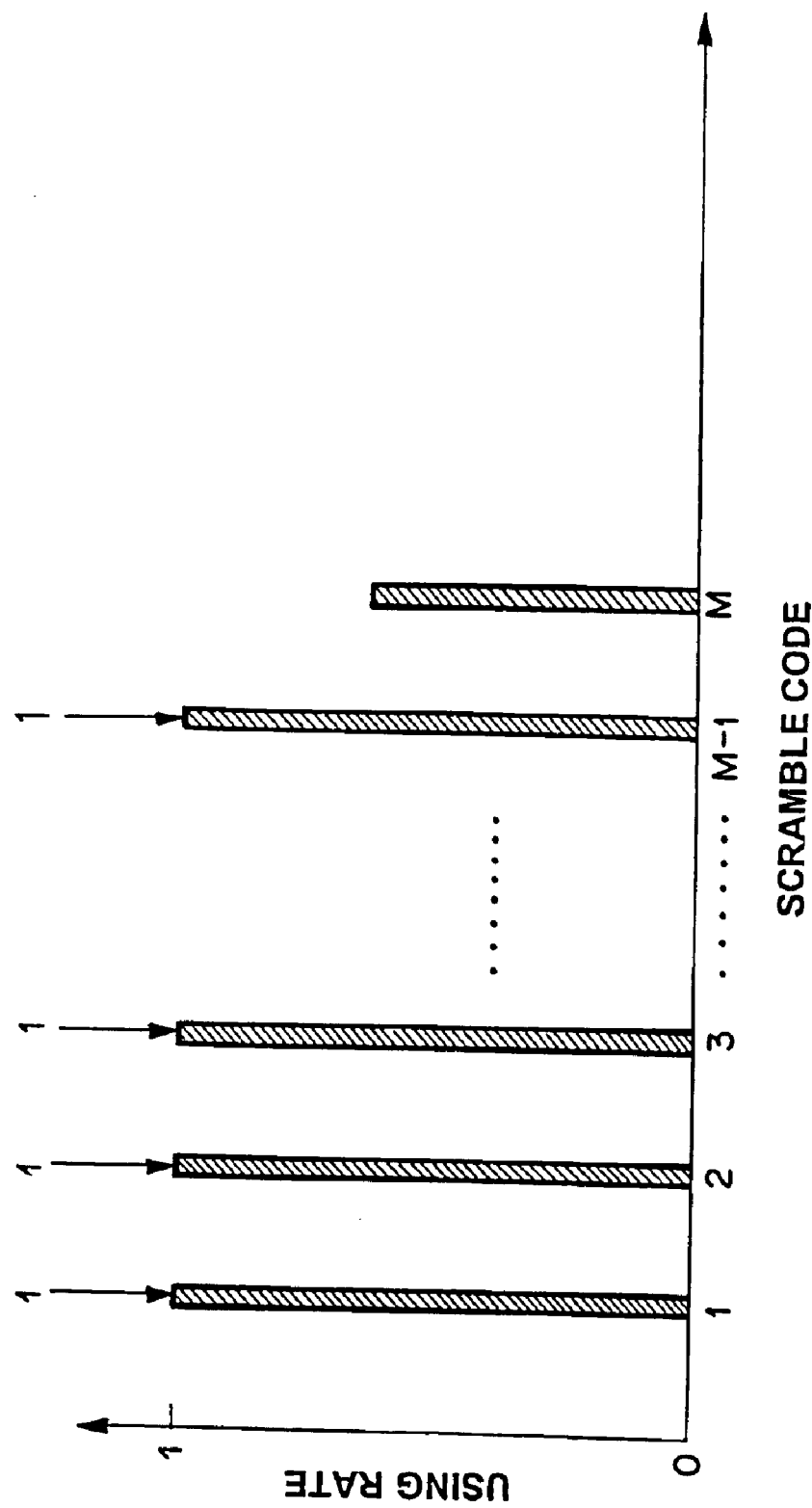

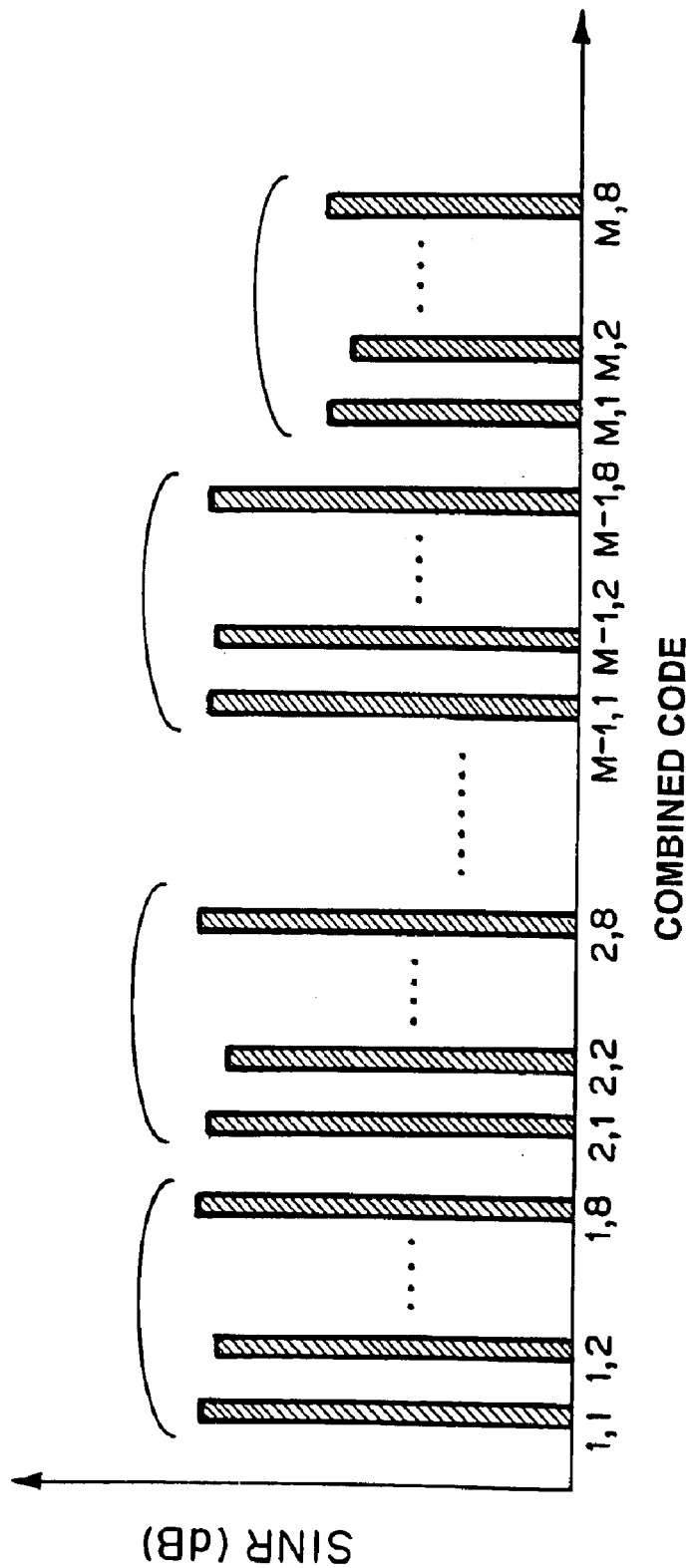

| | SCRAMBLE CODE | | | |
|---|---|---|---|---|
| ORTHOGONAL CODE | 1 | 2 | 3 | 4 |
| 1 | 9 | 1 | 17 | 25 |
| 2 | 10 | 2 | 18 | 26 |
| 3 | 11 | 3 | 19 | 27 |
| 4 | 12 | 4 | 20 | 28 |
| 5 | 13 | 5 | 21 | 29 |
| 6 | 14 | 6 | 22 | 30 |
| 7 | 15 | 7 | 23 | 31 |
| 8 | 16 | 8 | 24 | 32 |

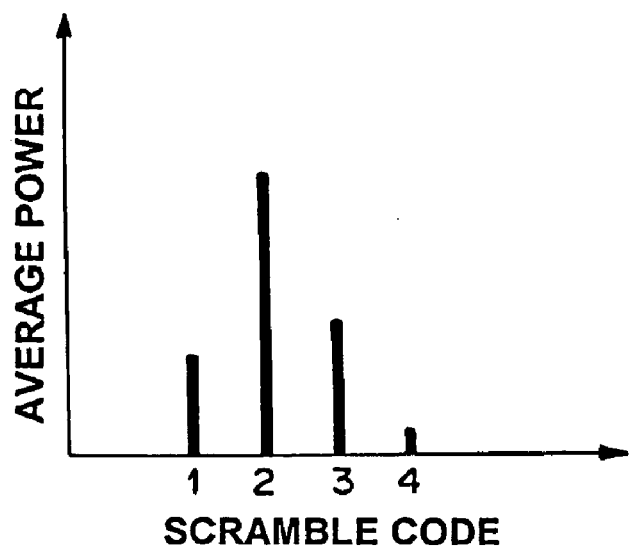

METHOD AND BASE STATION FOR ALLOCATING PSEUDO NOISE CODE

BACKGROUND OF THE INVENTION

1. Technical Field of the Invention

The present invention relates to a method and base station for allocating pseudo noise (PN) codes on a downward transmission channel which carries spread spectrum signals for code division multiple access (CDMA) from a base station to a plurality of mobile stations.

2. Description of the Prior Art

The spread spectrum signals modulated by the PN codes properly allocated to the mobile stations are multiplexed and transmitted from the base station to the mobile stations. Therefore, the transmission signals are easily synchronized, because the transmission signals are transmitted simultaneously onto the downward direction. Further, the interference between the transmission signals can be suppressed by using the orthogonal code.

However, it difficult to synchronize the signals from one base station with the signals from the other base station. Therefore, the scramble code such as Gold code or a part thereof are used in addition to the orthogonal code.

A conventional transmitter of the base station is shown in FIG. 17. In spread adder unit SPU as shown in FIG. 17, transmission signal to mobile station Si ("i"=1 to n) is multiplied by orthogonal code Co,i in multiplier 001. Then, the outputs from multipliers 001 are added in adder 002. Further, the output from adder 002 is multiplied by scramble code Cs in multiplier 001 in order to obtain combined signal.

Combined signal is modulated in modulator 003 and transmitted from antenna 004 to the mobile stations. When all the base stations employ the transmitter as shown in FIG. 17, the interference between the signals from the base stations are randomized, or in other words, suppressed.

It must be avoided that numerous codes are used unnecessarily, because the number of the orthogonal codes are limited. However, there are several cases of the unnecessary consumption of code in CDMA system.

The code consumption is increased, when a plurality of the base stations transmit the identical signals towards one mobile station in the soft hand-over (SHO).

The code consumption is also increased, when the base station intends to control many mobile stations by cutting off the communication with a mobile station whose signal goes through silent period.

Further, the code consumption is increased, when inter-cellular interference is weakened due to many obstacles.

Therefore, when the number of the mobile stations is greater than the number of the orthogonal codes in a base station, the base station has to use a plurality of the scramble codes.

A conventional transmitter of the base station which employs "k" scramble codes is shown in FIG. 18. Spread adder unit SPU-i (i=1 to k) outputs combined spread signal Sd-j on the basis of transmission signal Si,nj, orthogonal code Co, nj, and scramble code Cs,i. Here, signal Si,nj is a signal which is transmitted by a "nj"-th mobile station with scramble code "j". Further, number "nj" is the number of the orthogonal codes generated by j-th scramble code Cs,j. Transmission signal Si,nj may contain control signal which is commonly used. Combined spread signals Sd-i (for i=1 to k) are added in adder 002. The output from adder 002 are modulated by modulator 003. Antenna 004 transmits the output of modulator 003 towards the mobile stations.

Spread adder unit SPU-j outputs combined spread spectrum signal Sd-j on the basis of transmission signal Sj,h. Here, "h" is an ordinal number of orthogonal code Co,h, and Cs,j is a scramble code. Combined spread spectrum signal Sd-1, Sd-2, . . . , and Sd-k are added in adder 002. The output from adder 002 are fed into modulator 003 to be transmitted from antenna 004 towards the mobile stations.

An example of a relation of signal to interference noise ratio (SINR) vs. combined code is shown in FIG. 19. The combined code is expressed, for example, as (2, n2), where "2" is an ordinal number of scramble code and "n2" is an ordinal number of orthogonal code. The SINR as shown in FIG. 19 is low for every combined code, when all the combined codes are used randomly or with equal frequency in use.

When a plurality of the scramble codes are used simultaneously, the mobile station suffers interference due to signals with other scramble codes for other stations. Thus, quality of communication channel is degraded, because the interference between different scramble codes is greater than that between the identical scramble codes.

SUMMARY OF THE INVENTION

An object of the present invention is to provide a code allocation method which suppresses the interference between the spread spectrum signals and decreases the number of codes.

In the code allocation method of the present invention, the scramble codes and the orthogonal codes are arranged in the order of priority, and the codes for the mobile stations are allocated in that priority order. The code used by a mobile station which ends or stops temporarily its call is re-allocated to other mobile station which uses the lowest priority code.

Further, in the present invention, higher priority codes are allocated for the communication under higher service quality or higher signal quality. The higher priority codes may be allocated in the order of the lower quality.

According to the present invention, the interference is suppressed, because the number of the scramble codes is minimized. Further, the mobile station which is given the higher priority codes receives smaller interference from the mobile stations which use the lower priority codes.

Further, according to the present invention, the code consumption is suppressed, due to the re-allocation at the time of the end of call or the temporal stop of call.

Furthermore, according to the present invention, the communication quality becomes uniform and the code consumption or the number of codes is minimized, because the higher priority codes are allocated in the order of the higher or lower quality which is requested or received by the mobile station.

BRIEF EXPLANATION OF THE DRAWINGS

FIG. 6 is a graph of the rate of using the orthogonal code vs. the scramble code in the third embodiment.

FIG. 7 is a graph of the SINR (signal to interference noise ratio) vs. the combined code in the third embodiment.

FIG. 10A is still another example of code allocation in the second embodiment.

FIG. 10B is an example of the priority matrix based on the still another example as shown in FIG. 10A.

PREFERRED EMBODIMENT OF THE INVENTION

First Mode of Embodiment

In the first mode of embodiment of the present invention, a first set including a plurality of first codes and a second set including one or more second codes. Here, the first codes are the orthogonal codes, while the second codes are the scramble codes such as Gold codes or a part thereof.

Further, combined codes are generated by multiplying the first codes by one of the second codes. Then, the combined codes are allocated to the mobile stations, or in other words, the combined codes are allocated to the spread spectrum signal to the mobile stations.

When the number of the combined codes are insufficient, new combined codes are generated by selecting other second code.

In the following, the first embodiment is explained, referring to FIGS. 1 and 2.

Figure 1:
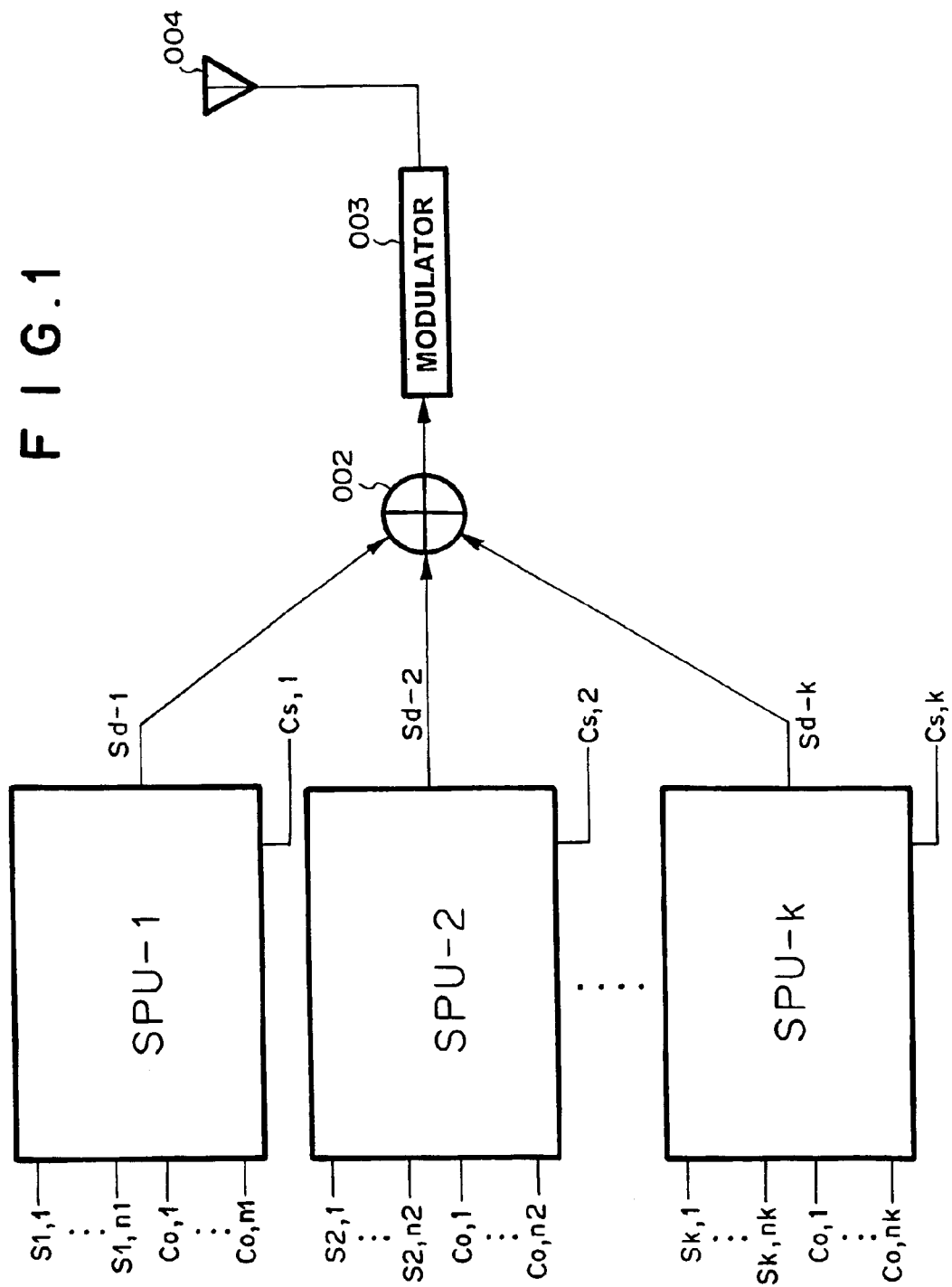
FIG. 1 is a block diagram of the base station which employs the method for allocating pseudo random (PN) codes of the present invention.
Figure 18:
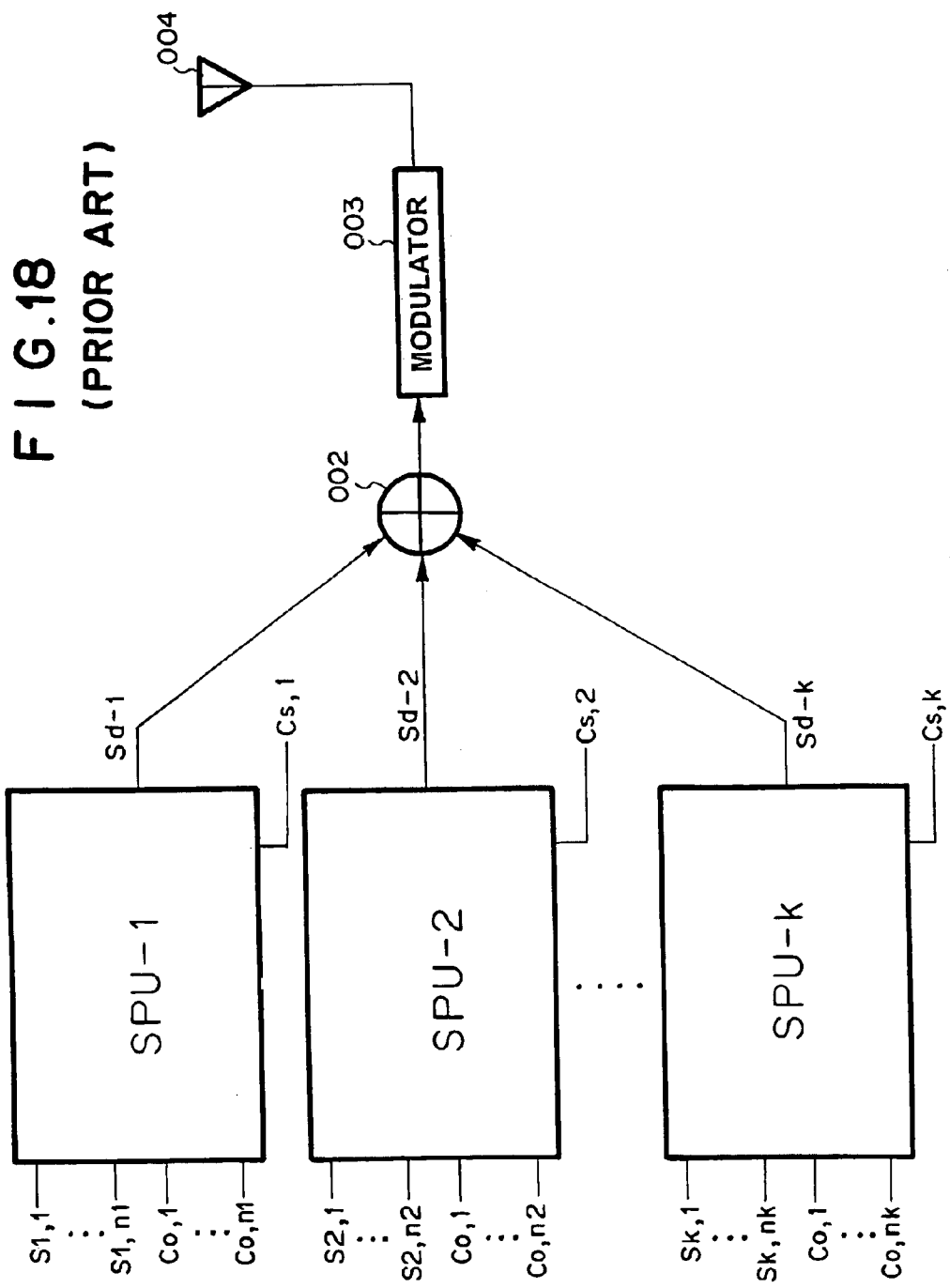
FIG. 18 is a conventional base station using a plurality of scramble codes.

The transmitter of the base station which uses "k" scramble codes as shown in FIG. 1 is the same as that as shown in FIG. 18.

The transmitter of the first embodiment of the present invention comprises spread adder unit SPU-i, adder 002, modulator 003, and antenna 004.

Spread adder unit SPU-i outputs combined spread signal Sd-j on the basis of transmission signal $S_i,nj$, orthogonal code $C_o, nj$, and scramble code $C_s,i$. Here, signal $S_i,nj$ is a signal which is transmitted by a "nj"-th mobile station with scramble code "j". Further, "nj" is the number of the orthogonal codes generated by j-th scramble code $C_s,j$. Transmission signal $S_i,nj$ may contain control signal which is commonly used.

Combined spread signals Sd-i (for i=1 to k) are added in adder 002.

The output from adder 002 are modulated by modulator 003.

Antenna 004 transmits the output of modulator 003 towards the mobile stations.

Figure 2:
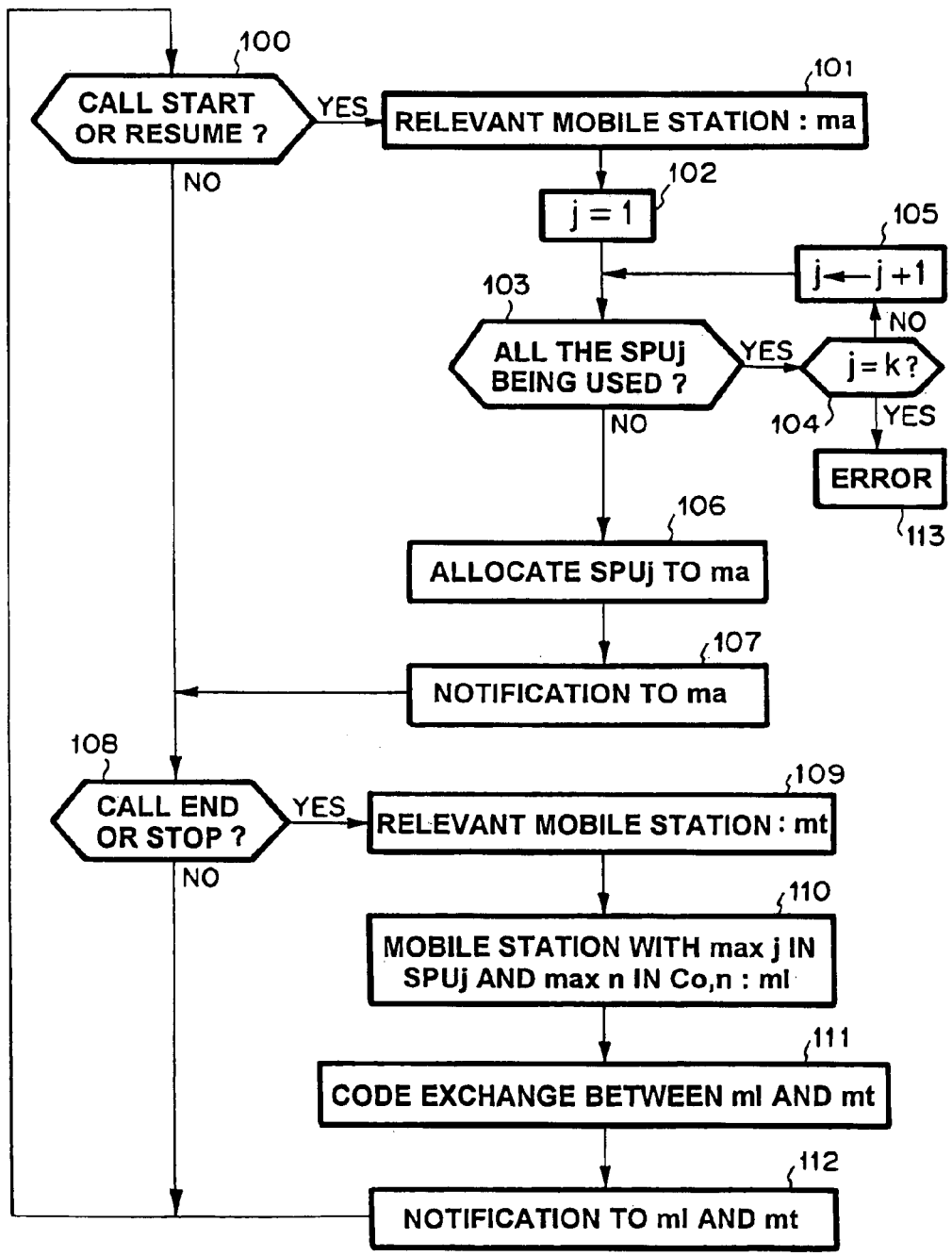
FIG. 2 is a flow chart of PN code allocation of the first embodiment of the present invention.

Next, the operation of the first embodiment is explained, referring to FIGS. 1 and 2.

The combined codes are allocated to the mobile stations in due order of SPU1, SPU2, . . . , SPUk.

At first, signal $S_1,nj$ received by the base station is inputted into SPU-1. Then, $S_1,nj$ is allocated to orthogonal code $C_o,nj$, in other words, a combined code which is generated by the multiplication of the first codes by one of the second code. When the combined codes become insufficient, the signal received by the base station is inputted into SPU2.

Similarly, when all the combined codes of SPU1 and SPU2 are used, the combined codes become insufficient. In this case, the received signal is inputted into SPU-3. These procedures are repeated up to SPU-k.

A flow chart for the code allocation is shown in FIG. 2.

At step 100, the base station inspects whether there is any call-out or request for resuming transmission. Step 100 is followed by step 101, when there is a call-out or request for resuming transmission. Step 400 is followed by step 108, when there is neither any all-out nor request for resuming transmission.

At step 101, the number of the object mobile station is set up in variable ma. Further, "j" is set up to be 1 (unity) at step 102. Next, at step 103, the base station inspects whether or not all the combined codes of SPU-j are used. The inspection is executed, beginning from n=1, in the order of n of Co, n.

When all the combined codes of all SPU-j are used, it is inspected whether or not "j" is "k". When "j" is not "k", "j" is replaced by "(j+1)" at step 105, and then step 103 is executed again. On the contrary, when "j" is equal to "k", the allocation is ended at step 113.

Then, when a combined code which is left unused is found at step 103, the unused combined code is allocated at step 106 to the mobile station of which ordinal number is "ma". At the same time, the combined code allocated to the mobile station at step 106 is transmitted at step 107 from the base station to the mobile station. Step 107 is followed by step 108.

At step 108, the base station inspects whether there is any mobile station which has finished, or stopped temporarily the call. When the base station find out such a mobile station, the identity number of the mobile station is set up in variable "mt" at step 109.

At step 110, variable "ml" is set up to be an identifier of such a mobile station which is connected with SPU-j with maximum "j" at present, and uses the orthogonal code Co, n with maximum "n". At step 111, the combined code allocated to mobile station "ml" is re-placed by the combined code allocated to mobile station "mt". The new allocation information is transmitted at step 112 from the base station towards mobile stations "mt" and "ml". Step 100 executed again after step 112.

The re-allocation may not be executed, when the ordinal number "j" of the scramble code of the mobile station which has ended or stopped temporarily the call is equal to the maximum number at present.

When there is not any mobile station which ends or temporarily stops the call at step 108, step 100 follows step 108.

The allocation method of the first embodiment is applied not only to the base station, but also to the control station.

Second Mode of Embodiment

Similarly to the first embodiment, the PN code allocation method of the second mode of embodiment of the present invention utilizes a first set of a plurality of first codes and a second set of one or more second codes, where the first codes are orthogonal codes and the second codes are scramble codes such as Gold codes or a part of them.

Then, combined codes are generated by multiplying the first codes by one or more second codes.

Further, the combined codes of the second embodiment are provided with priority orders. The transmission signal from the base station to the mobile stations is modulated by that combined code, according to the spectrum spread method.

The priority order of the combined codes may be the same order of priority of the second codes.

Similarly, the priority order of the combined codes may be, the same order of priority of the first codes.

In the following, the allocation method of the second embodiment is explained, referring to FIGS. 1 and 3. The block diagram of the transmitter of the second embodiment is the same as shown in FIG. 1. However, the operation of the second embodiment is different.

Figure 3:
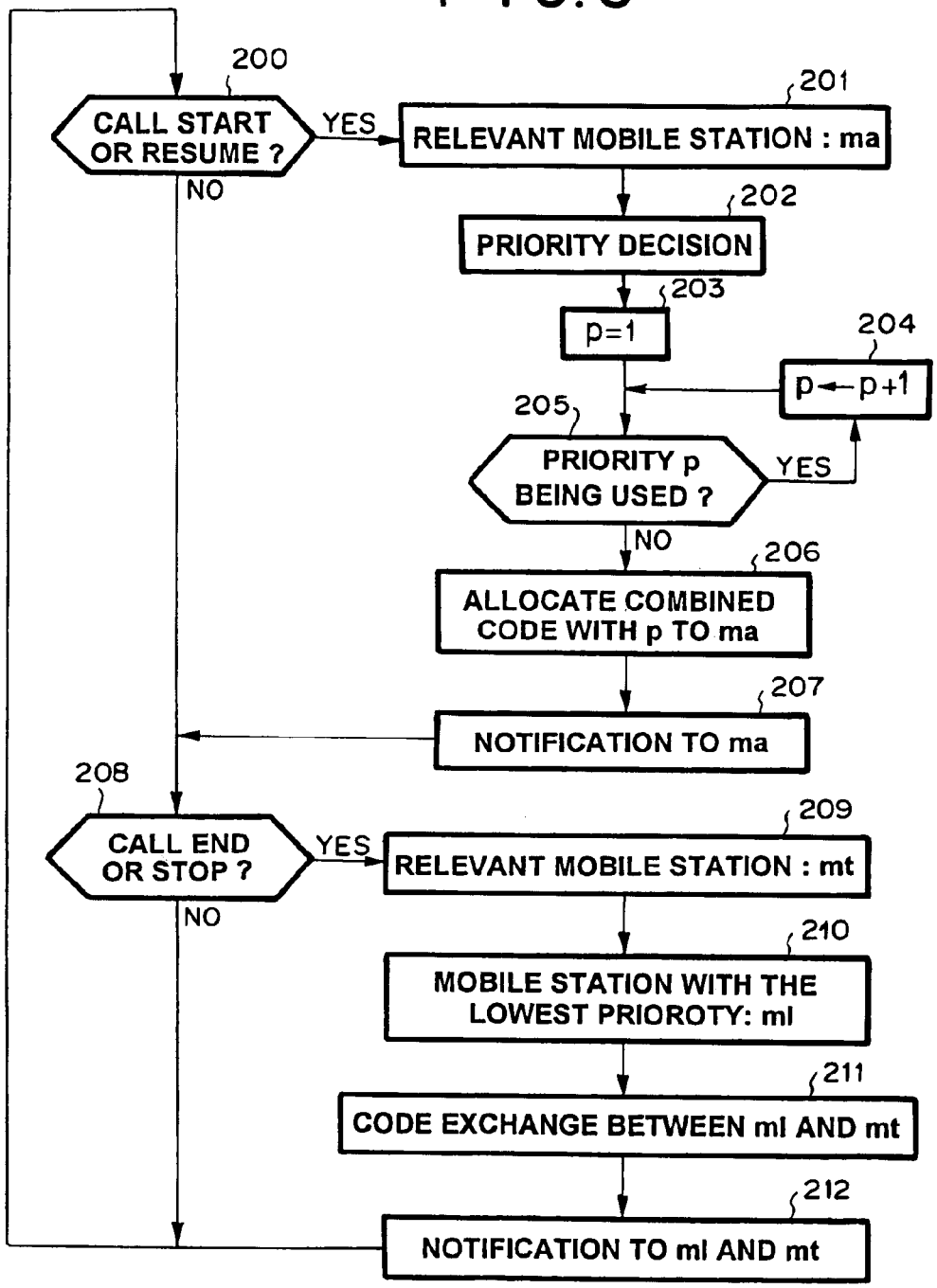
FIG. 3 is a flow chart of PN code allocation of the second embodiment of the present invention.

A flow chart for the allocation executed by the base station is shown in FIG. 3.

At step 200, the base station determines whether there is any new call from the mobile station, or any request for resuming the transmission. Step 200 is followed by step 201, when there is a new call, or a request, while step 200 is followed by step 208, when there is neither call, nor request.

At step 201, an identifier is set up in variable "ma". Further, at step 202, the priority of the combined signature or the combined code is set up. Furthermore, at step 203, priority variable p is set up to be 1 (unity: highest priority).

Step 205 is a step for determining whether or not the combined code or the third code with priority p is being used. When it is being used, priority p is replaced by (p+1) at step 204. Then, step 204 is followed by step 205 again.

When it is not being used, the combined code with priority p allocated to the mobile station with variable "ma" at step 206. The allocated combined code is notified to the mobile station ma at step 207. Then, step 207 is followed by step 208.

At step 208, the base station determines whether any of the mobile station has ended the call or has stopped the call temporarily. When there is an end of cal, or a temporal stop of call in a mobile station, the identifier of the mobile station is set up in variable "mt" at step 209.

At step 210, an identifier is set up for a mobile station with variable "ml" which uses the lowest priority code. At step 211, the combined code is exchanged between mobile station "ml" and mobile station "mt". The reallocation is notified from the base station to mobile stations "ml" and "mt" at step 212. Then, step 212 is followed by step 200.

The reallocation may not be executed at step 211, when the ordinal number "j" of the scramble code of the mobile station is equal to the maximum number.

Step 208 is followed by step 200, when there in neither end of call nor temporal stop of call.

Figures 4, 5:
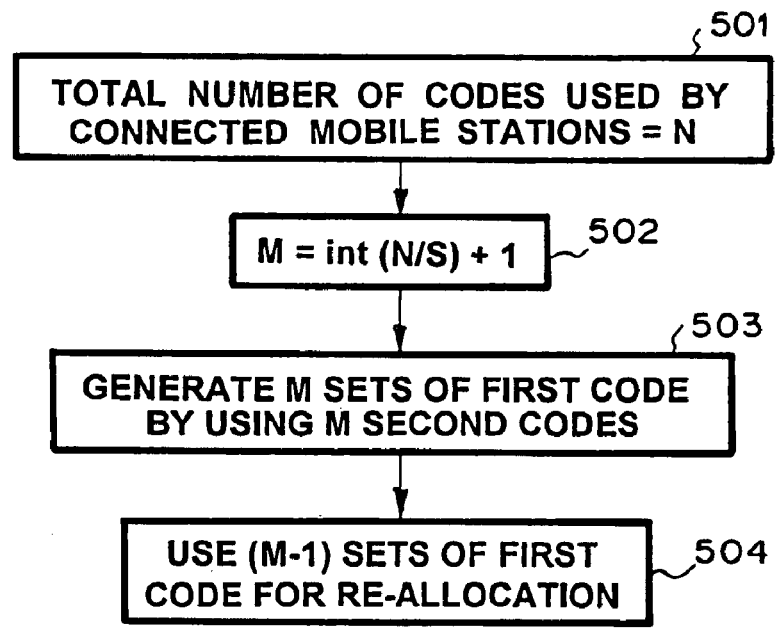
FIG. 4 is an example of priority matrix defined by orthogonal code and scramble code in the second embodiment.
FIG. 5 is a flow chart of PN code allocation of the third embodiment of the present invention.

An example of priority of the combined code is shown in FIG. 4.

The matrix elements are the priorities in a matrix defined by ordinal numbers of the orthogonal code and scramble code.

The smaller the ordinal number of scramble code is, the higher the priority is. Further, the smaller the ordinal number of the orthogonal code is, the higher the priority in the same scramble code.

The highest priority may be given to the commonly used control signal.

The allocation method of the second embodiment is applied not only to the base station, but also to the control station.

Figures 8A, 8B:
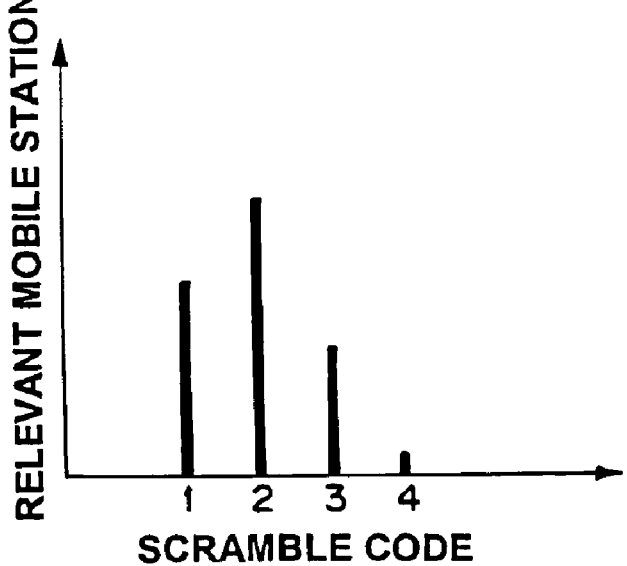
FIG. 8A is other example of code allocation in the second embodiment.
FIG. 8B is an example of the priority matrix based on the other example as shown in FIG. 8A.

Other example of priority of the combined code which decided at step 202 as shown in FIG. 3 for the second embodiment is shown in FIGS. 8A and 8B. The number of the identical scramble codes which are used simultaneously, or in other words, the number of relevant mobile stations which use the identical scramble code, is exemplified at an arbitrary time in FIG. 8A. Further, a priority matrix defined by the orthogonal code and scramble code is exemplified in FIG. 8B. The scramble codes allocated to the commonly used control signal may be excluded, when the number of the identical scramble code simultaneously used is counted. The greater the number as shown in FIG. 8A of the scramble code simultaneously used is, the higher the priority of the scramble code is, as shown in FIG. 8B. Further, the smaller the ordinal number of the orthogonal code is, the greater the priority of the orthogonal code is, for the same scramble code, as shown in FIG. 8B.

Thus, the code consumption is minimized, because only specified scramble codes are used always frequently, as shown in FIGS. 8A and 8B.

Figures 9A, 9B:
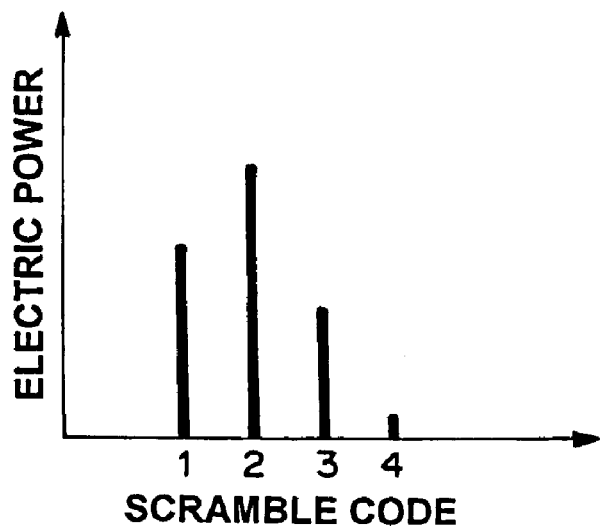
FIG. 9A is another example of code allocation in the second embodiment.
FIG. 9B is an example of the priority matrix based on the another example as shown in FIG. 9A.

Another example of priority of the combined code which decided at step 202 as shown in FIG. 3 for the second embodiment is shown in FIGS. 9A and 9B. The consumption of electric power simultaneously used is shown in FIG. 9A at an arbitrary time for each scramble code, while a priority matrix defined by the orthogonal code and scramble code is shown in FIG. 9B. The greater the power consumption as shown in FIG. 9A is, the higher the priority of the scramble code is, as shown in FIG. 9B. Further, the smaller the ordinal number of the orthogonal code is, the greater the priority of the orthogonal code is, for the same scramble code, as shown in FIG. 9B.

Thus, the code consumption is minimized, because only specified scramble codes are used always frequently, as shown in FIGS. 9A and 9B.

Still another example of priority of the combined code which decided at step 202 as shown in FIG. 3 for the second embodiment is shown in FIGS. 10A and 10B. The average, electric power consumed for transmitting the signal with the allocated scramble code is shown in FIG. 10A at an arbitrary time for each scramble code, while a priority matrix defined by the orthogonal code and scramble code is shown in FIG. 10B. The scramble codes allocated to the commonly used control signal may be excluded, when the average power consumpti0on is calculated, because the commonly used control signal is transmitted under fixed electric power. The smaller the average power consumption as shown in FIG. 10A is, the higher the priority of the scramble code is, as shown in FIG. 10B. Further, the smaller the ordinal number of the orthogonal code is, the greater the priority of the orthogonal code is, for the same scramble code, as shown in FIG. 9B. Furthermore, the priorities of the scramble codes which are not used at all are made lower than those which are being used.

Thus, the code consumption is minimized, because only specified scramble codes are used always frequently, as shown in FIGS. 10A and 10B.

Third Mode of Embodiment

Similarly to the first and second second embodiment, the PN code allocation method of the third mode of embodiment of the present invention utilizes a set including a plurality of first codes and a second set of one or more second codes, where the first codes are orthogonal codes and the second codes are scramble codes-such as Gold codes or a part of them.

In the third embodiment, "M" new sets are generated by combining the first codes with "M" second codes. The PN code allocation is executed by using (M−1) new sets.

In the following, the allocation method of the third embodiment is explained, referring to FIGS. 1 and 5. The block diagram of the transmitter of the third embodiment is the same as shown in FIG. 1. However, the operation of the third embodiment is different.

A flow chart for the allocation executed by the base station is shown in FIG. 5.

At step 501, the base station grasps the total number "N" of codes used by all the mobile stations connected with the base station. "N" may exceed the total number of mobile stations, because one mobile station may use a plurality of codes.

At step 502, the necessary number "M" of the second codes is calculated, Here, $$M=int(N/S)+1,$$

where int(x)=n for x=n+$\alpha$ (n:integer 0<$\alpha$<1), and S is the total number of the orthogonal codes.

At step 503, "M" sets of scramble codes are generated, by multipling the first codes by "M" second codes.

At step 504, all the 1-st set to the (M−1)-th set of the generated scramble codes are allocated to the transmission signals. The M-th set of scramble codes may be used, if necessary. In the third embodiment of the present invention, any other scramble codes are not used at all, even if they are avalable.

Therefore, the rate of using the orthogonal codes is "1" (unity) for the ordinal number of scramble code smaller or equal to (M−1), as shown in FIG. 6.

The allocation method of the second embodiment is applied not only to the base station, but also to the control station.

The relation between SINR and the combined code is shown in FIG. 7, under the rate of using as shown in FIG. 6. The combined code (2,8) as shown in FIG. 7, for example, is a code generated by combining the scramble code 2 and the orthogonal code 8. The SINR for the combined code smaller than or equal to (M−1) is almost constant, while The SINR for the combined code greater than or equal to M becomes small.

Figure 19:
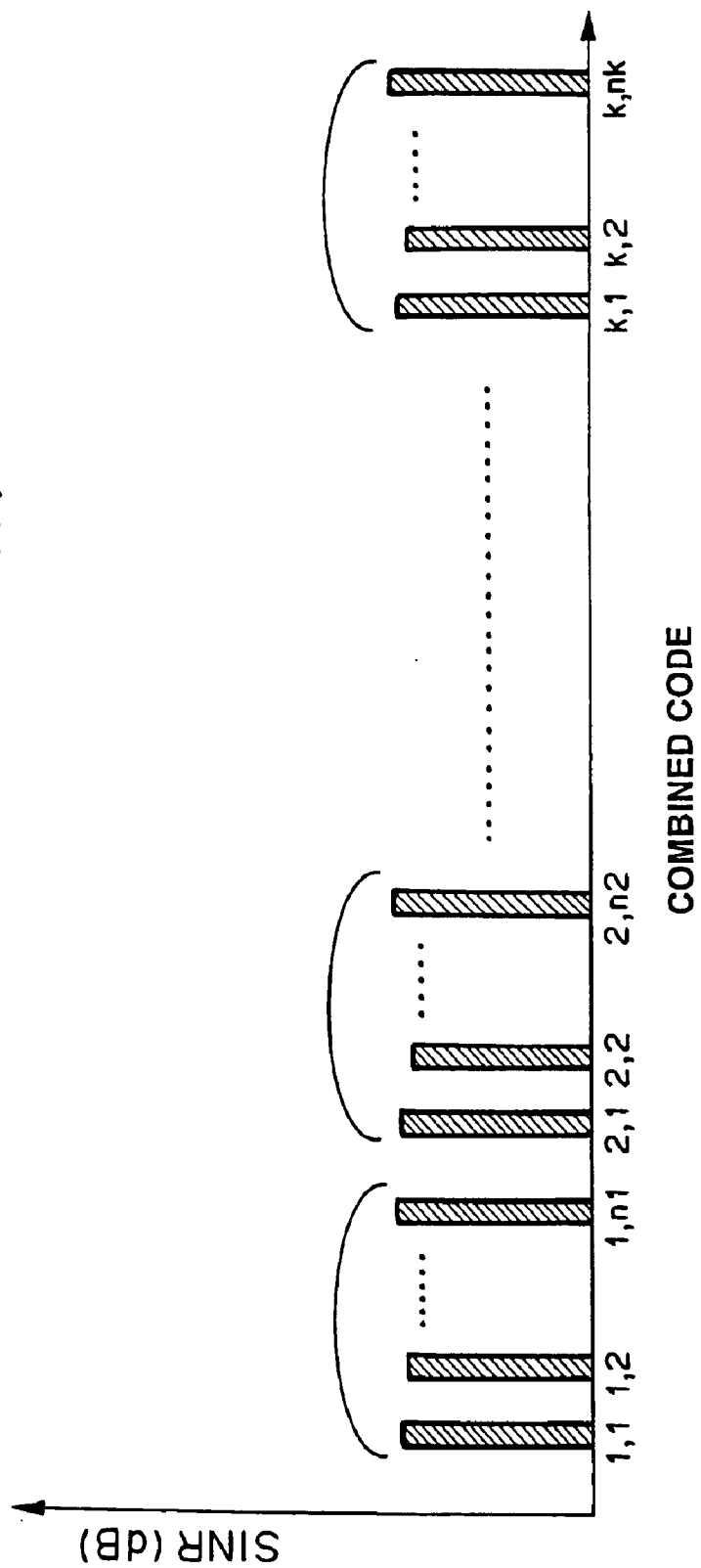
FIG. 19 is SINR of transmission signals received by mobile stations connected with the conventional base station.

The average SINR as shown in FIG. 7 is greater than that as shown in FIG. 19, because the interference between the scramble codes is minimized due to the minimized number of the scramble codes.

The higher priority scramble codes are allocated to the mobile station in accordance with the priority in the secod embodiment, as shown in FIG. 7. Therefore, the interference due to the lower priority codes iecreased.

Further, the code consumption is suppressed, due to the re-allocation at the end of call or the temporal stop of call.

Fourth Mode of Embodiment

In the following, the allocation method of the fourth embodiment is explained, referring to FIGS. 1, 11 and 12.

The block diagram of the transmitter of the fourth embodiment is the same as shown in FIG. 1. However, the operation of the second embodiment is different.

Figures 11, 12:
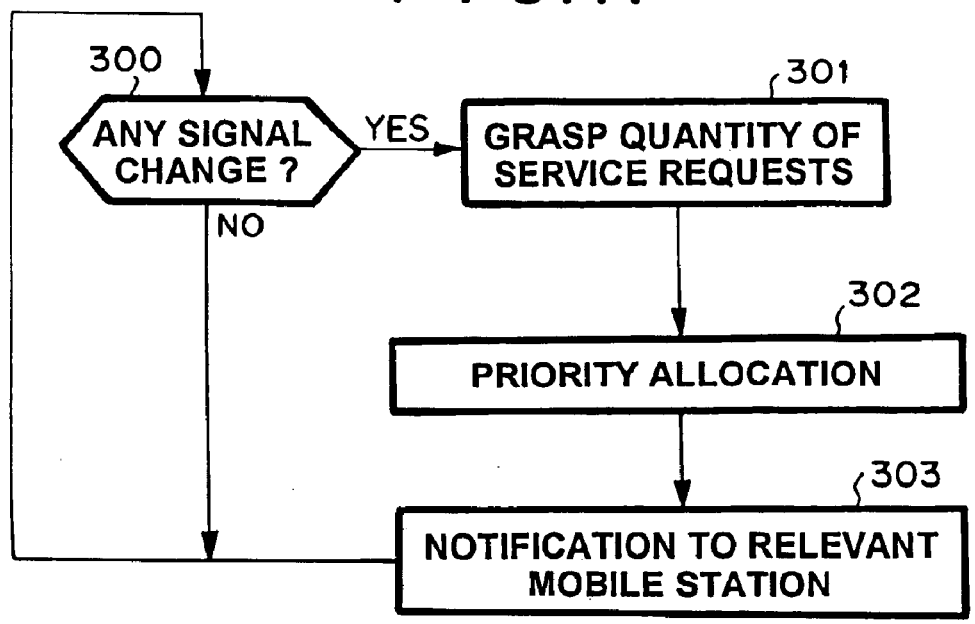
FIG. 11 is a flow chart of PN code allocation of the fourth embodiment of the present invention.
FIG. 12 is is an example of the priority matrix in the fourth embodiment.

A flow chart for the allocation executed by the base station is shown in FIG. 11. Further, an example of the priority matrix is shown in FIG. 12.

Firstly, the flow chart as shown in FIG. 11 is explained. It is assumed that the priority is already given in accordance with the second embodiment. At step 300, the base station determines whether there is any change in a set of signals transmitted by itself. Step 300 is followed by step 301, when there is a change, while step 300 is recovered, when there is not any change.

At step 301, the base station grasps the quantity of the service requests from all the mobile stations. Then, at step 302, higher priorities are given to the transmission signals with higher or lower quantities of the service requests; Here, the service request may be a transmission speed, an error rate of transmission, or these functions. At step 303, the re-allocation of code is notified to the relevant mobile stations. Step 303 is followed by step 300 again.

An example of the priority matrix is shown in FIG. 12. The matrix elements are the priorities in a matrix defined by ordinal numbers of the orthogonal code and scramble code. The smaller the ordinal number of scramble code is, the higher the priority is. Further, the smaller the ordinal, number of the orthogonal code is, the higher the priority in the same scramble code.

Figure 13:
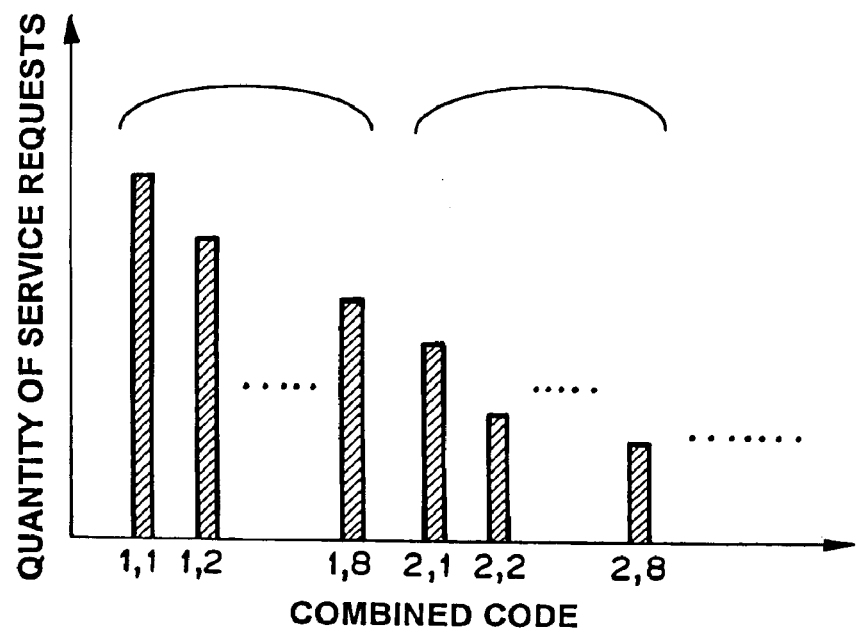
FIG. 13 is a graph of the quantity of service requests vs. the combined code in the fourth embodiment.

The quantity of the service requests is shown in FIG. 13.

The lower the ordinal numbers of the scramble codes and orthogonal codes are, the greater the quantity of the service requests of the transmission signals. Thus, the code consumption is minimized, because the scramble codes with lower ordinal numbers are used more frequently, as shown in FIG. 13. Furthermore, the quantities of the service requests are kept almost constant for the same scrambles code.

The allocation method of the second embodiment is applied not only to the base station, but also to the control station.

Fifth Mode of Embodiment

In the following, the allocation method of the fifth embodiment is explained, referring to FIGS. 1, 14 and 15. The block diagram of the transmitter of the fifth embodiment is the same as shown in FIG. 1. However, the operation of the second embodiment is different.

Figure 14:
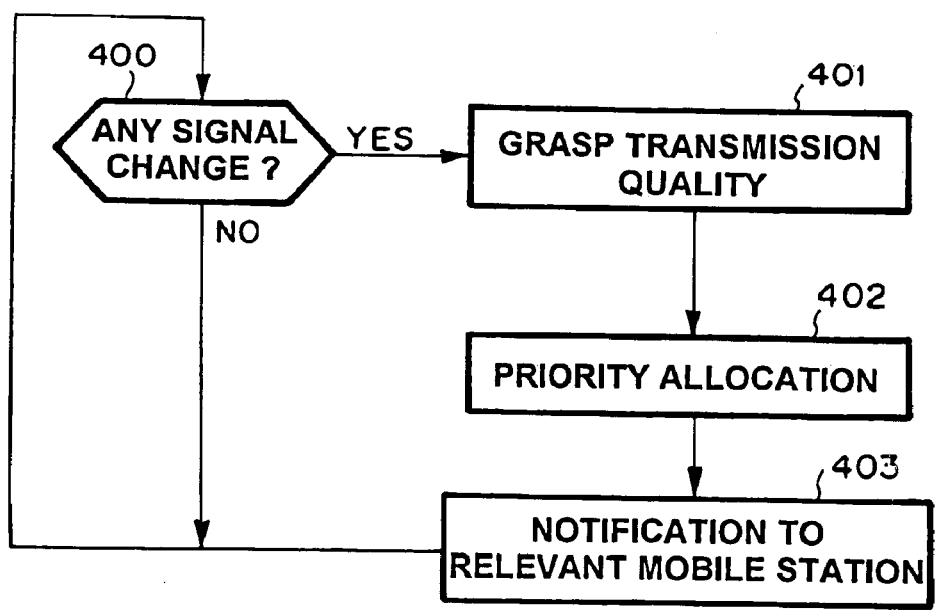
FIG. 14 is a flow chart of PN code allocation of the fifth embodiment of the present invention.

A flow chart for the allocation executed by the base station is shown in FIG. 14. Further, an example of the priority matrix is shown in FIG. 15.

Firstly, the flow chart as shown in FIG. 14 is explained.

It is assumed that the priority is already given in accordance with the second embodiment. At step 400, the base station determines whether there is any change in a set of signals transmitted by itself. Step 400 is followed by step 401, when there is a change, while step 400 is recovered, when there is not any change.

At step 401, the base station grasps the transmission quality. Then, at step 402, higher priorities are given to the transmission signals with higher or lower transmission qualities. Here, the transmission quality may be interference observed by the mobile station, electric power of commonly used control signal received by the mobile station, SINR at the mobile station. These transmission qualities are assumed to be transmitted from the mobile station through the control channel to the base station.

For example, the SINR of a mobile station may be calculated by obtaining the received electric power EP1 of the commonly used control signal transmitted from the base station which is connected with the mobile station, and by obtaining the received electric power EP2 of the commonly used control signal transmitted from the base station which is not connected with the mobile base station. The SINR is the ratio (EP1/EP2).

At step 403, the re-allocation of code is notified to the relevant mobile stations. Step 403 is followed by step 400 again.

An example of the priority matrix is shown in FIG. 14. The matrix elements are the priorities in a matrix defined by ordinal numbers of the orthogonal code and scramble code. The smaller the ordinal number of scramble code is, the higher its priority is. Further, the smaller the ordinal number of the orthogonal code is, the higher the priority of the orthogonal code in the same scramble code.

Figures 15, 16:
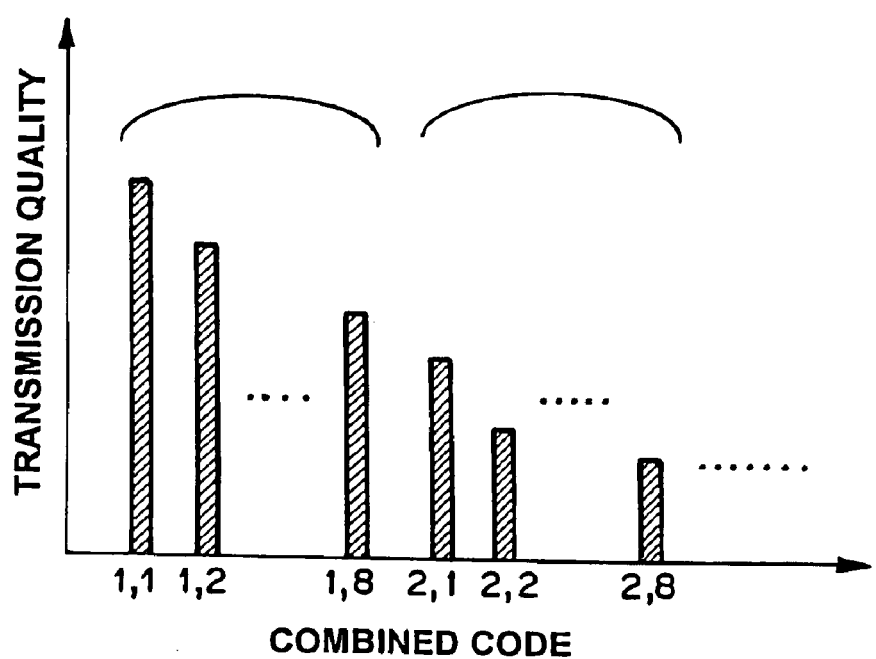
FIG. 15 is an example of the priority matrix in the fifth embodiment.
FIG. 16 is a graph of transmission quality vs. combined code in the fifth embodiment.
Figure 17:
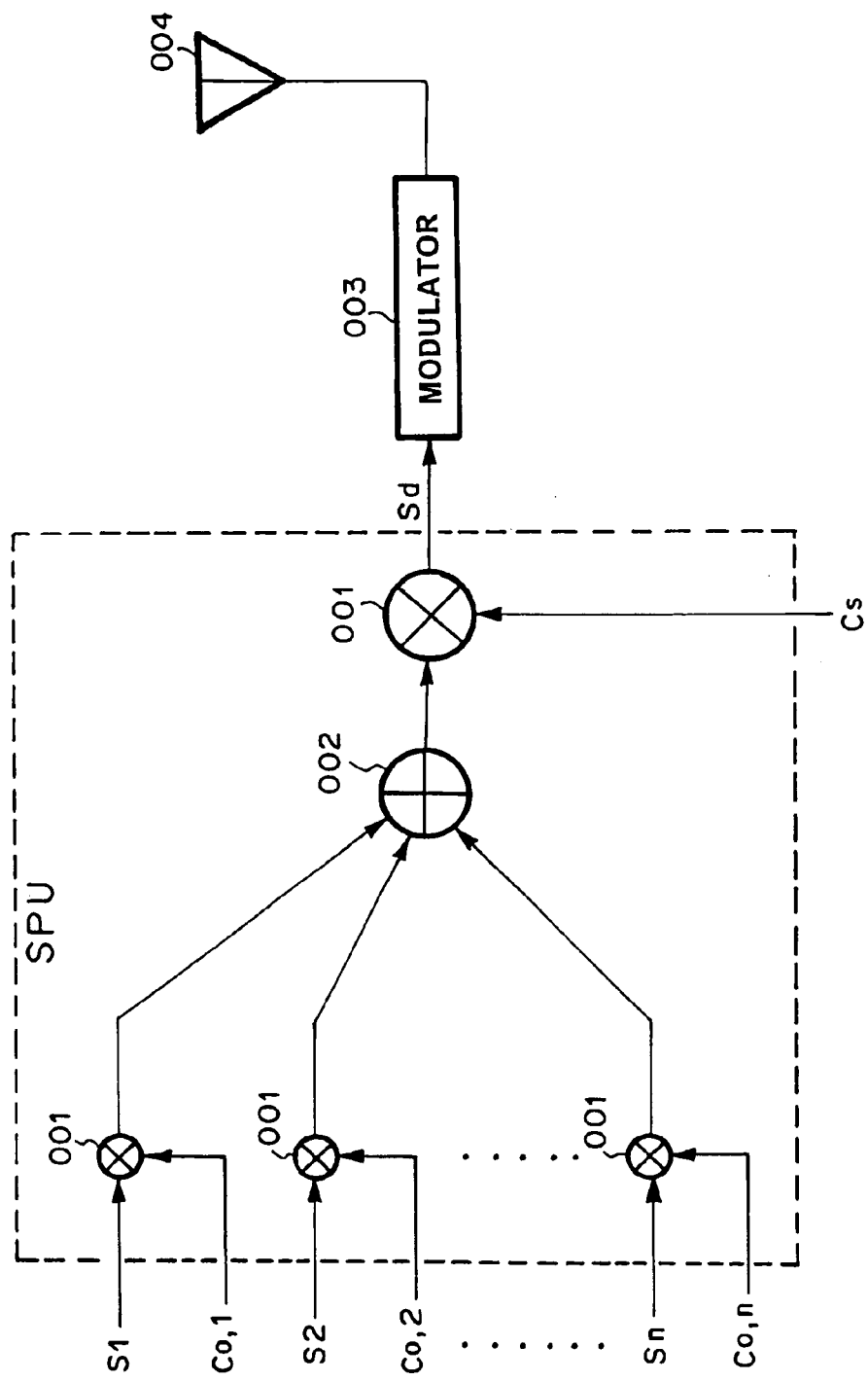
FIG. 17 is a conventional base station using a single scramble code.

The transmission quality is shown in FIG. 16. The lower the ordinal numbers of the scramble codes and orthogonal codes are, the greater the transmission quality of the transmission signal is. Thus, the code consumption is minimized, because the scramble codes with lower ordinal numbers are used more frequently, as shown in FIG. 16. Furthermore, the transmission qualities are kept almost constant for the same scramble code.

The allocation method of the second embodiment is applied not only to the base station, but also to the control station.

What is claimed is:

1. A code allocation method for allocating a first set of first codes and a second set of second codes to mobile stations, the method comprising:
   generating a third set of combined codes by multiplying said first codes by one of said second codes;
   allocating each of said combined codes to each of said mobile stations;
   transmitting spread spectrum signals with said combined codes to said mobile stations;
   generating another set of combined codes by multiplying said first codes by another different code selected from said second set of said second codes after said third set of combined codes has been used to transmit an approved spectrum signals.

2. A code allocation method for allocating a first set of orthogonal codes and a second set of scramble codes to mobile stations, which comprises the steps of:
   generating a third set of combined codes by multiplying said orthogonal codes by one of said scramble codes;
   arranging said combined codes in a priority order;
   allocating each of said combined codes to each of said mobile stations;
   transmitting spread spectrum signals with said combined codes to said mobile stations.

3. A code allocation method for allocating a first set of first codes and a second set of second codes to mobile stations, which comprises the steps of:
   generating "M" sets of combined codes by multiplying said first codes by "M" said second codes, wherein M is defined by (int (N/S)+1), where N is the total number of code used by all the mobile stations connected with a base station and S is the total number of said orthogonal codes;
   transmitting spread spectrum signals with said combined codes to said mobile stations.

4. The code allocation method according to claim 2, wherein:
   said second codes are arranged in a priority order; and said combined codes are arranged in said priority order.

5. The code allocation method according to claim 2, wherein:
   said first codes are arranged in a priority order; and said combined codes are arranged in said priority order.

6. The code allocation method according to claim 2, wherein said combined codes are arranged in such a priority order that said second codes give higher priority to said combined codes in order of the frequency of said second codes.

7. The code allocation method according to claim 6, wherein said frequency of said second codes is counted, excluding said second codes modulated into a commonly used control signal.

8. The code allocation method according to claim 2, wherein said combined codes are arranged in such a priority order that said second codes give higher priority to said combined codes in order of the greatness of summation of electric power of transmission signals with said second codes of the same value.

9. The code allocation method according to claim 2, wherein said combined codes are arranged in such a priority order that said second codes give higher priority to said combined codes in order of smallness of average electric power of transmission signals with same value of said second codes.

10. The code allocation method according to claim 9, wherein said average electric power is calculated, excluding commonly used control signal.

11. The code allocation method according to claim 2, wherein one of said combined codes allocated to a mobile station which ends its call is allocated to an other mobile station with the other of said combined codes with the lowest priority.

12. The code allocation method according to claim 2, wherein one of said combined codes allocated to a mobile station which stops temporarily its call is allocated to an other mobile station with the other of said combined codes with the lowest priority.

13. The code allocation method according to claim 2, wherein said code allocation is not executed, when the second code included in one of said combined codes of a mobile station which ends or stops temporarily its call is equal to the second code of an other mobile station with other of said combined codes of which priority is the lowest.

14. The code allocation method according to claim 2, wherein said base station notifies a relevant mobile station of said code allocation, when said code allocation is changed.

15. The code allocation method according to claim 2, wherein said code allocation is based on quantity of service requests from said mobile stations connected with said base station.

16. The code allocation method according to claim 15, wherein said service requests include a transmission error rate.

17. The code allocation method according to claim 15, wherein said service requests include a transmission speed.

18. The code allocation method according to claim 15, wherein said service requests include functions of transmission error rate and/or transmission speed.

19. The code allocation method according to claim 2, wherein said combined codes are allocated to said mobile stations on the basis of transmission qualities measured by said mobile stations.

20. The code allocation method according to claim 19, wherein said transmission qualities include electric power of interference noise.

21. The code allocation method according to claim 19, wherein said transmission qualities include electric power of commonly used control signal.

22. The code allocation method according to claim 19, wherein said transmission qualities include signal to interference noise ratio (SINR).

23. The code allocation method according to claim 19, wherein said SINR is a ration of an electric power of commonly used control signal from connected base station and an electric power of commonly used control signal from non-connected base stations.

24. The code allocation method according to claim 15, wherein said code allocation is executed, when a set of transmission signals from said base station is changed.

25. The code allocation method according to claim 24, wherein said base station notifies a relevant mobile station of said code allocation, when said code allocation is executed.

26. The code allocation method according to claim 1, wherein:
said first codes are orthogonal codes; and
said second codes are Gold codes or a part thereof.

27. The code allocation method according to claim 2, wherein:
said scramble codes are Gold codes or a part thereof.

28. The code allocation method according to claim 2, wherein said spread spectrum signal modulated by one of said combined codes
include a commonly used control signal.

29. The code allocation method according to claim 28, wherein said one of said combined codes which is allocated to said commonly used control signal has the highest priority.

30. A base station for allocating a first set of first codes and a second set of second codes to "k" mobile stations, which comprises:
"k" spread adder units for inputting said second codes and transmission signals accompanied by said second codes for outputting spread spectrum signals; and
an adder for adding said spread spectrum signals from said "k" spread adders units, wherein:
a third set of combined codes is generated by multiplying said first codes by one of said second codes;
each of said combined codes is allocated to each of said "k" mobile stations;
said spread spectrum signals with said combined codes are transmitted from said adder to said "k" mobile stations; and
another set of combined codes is generated by multiplying said first codes by an other code selected from said second codes, for meeting ta shortage of said combined codes included in said third set.

31. A base station for allocating a first set of first codes and a second set of second codes to "k" mobile stations, which comprises:
"k" spread adder units for inputting said second codes and transmission signals accompanied by said second codes for outputting spread spectrum signals; and
an adder for adding said spread spectrum signals from said "k" spread adders units, wherein:
a third set of combined codes is generated by multiplying said first codes by one of said second codes;
said combined codes are arranged in a priority order;
each of said combined codes is allocated to each of said mobile stations; and
said spread spectrum signals with said combined codes are transmitted from said adder to said "k" mobile stations.

32. A base station for allocating a first set of first codes and a second set of second codes to "k" mobile stations, which comprises:
"k" spread adder units for inputting said second codes and transmission signals accompanied by said second codes for outputting spread spectrum signals; and
an adder for adding said spread spectrum signals from said "k" spread adders units, wherein:
"M" sets of combined codes are generated by multiplying said first codes by "M" said second codes, wherein M is defined by (int (N/S)+1), where N is the total number of code used by all the mobile stations connected with a base station and S is the total number of said orthogonal codes;
all the 1-st set to the (M−1)-th set of combined codes are allocated to the mobile stations; and
spread spectrum signals with said combined codes are transmitted to said mobile stations.

33. The base station according to claim 31, wherein:
said second codes are arranged in a priority order; and
said combined codes are arranged in said priority order.

34. The base station according to claim 31, wherein:
said first codes are arranged in a priority order; and
said combined codes are arranged in said priority order.

35. The code allocation method according to claim 32, wherein said combined codes are arranged in such a priority order that said second codes give higher priority to said combined codes in order of the use-frequency of said second codes.

36. The base station according to claim 32, wherein said combined codes are arranged in such a priority order that said second codes give higher priority to said combined codes in order of the greatness of summation of electric power of transmission signals with said second codes of the same value.

37. The base station according to claim 32, wherein said combined codes are arranged in such a priority order that said second codes give higher priority to said combined codes in order of the smallness of average electric power of transmission signals with said second codes of the same value.

38. The code allocation method according to claim 32, wherein one of said combined codes allocated to a mobile station which ends its call is allocated to other mobile station with other of said combined codes with the lowest priority.

39. The base station according to claim 38, wherein said code allocation is not executed, when the second code included in one of said combined codes of a mobile station which ends or stops temporarily its call is equal to the second code of the other mobile station with the other of said combined codes of which priority is the lowest.

40. The base station according to claim 32, wherein said base station notifies a relevant mobile station of said code allocation, when said code allocation is changed.

41. The code allocation method according to claim 32, wherein said combined codes are allocated to said mobile stations on the basis of transmission qualities measured by said mobile stations.

* * * * *